(12) United States Patent
Subramanian (10) Patent No.: US 8,429,781 B2
(45) Date of Patent: Apr. 30, 2013

(54) MODULAR PORTABLE FROST AND SNOW REMOVER

(75) Inventor: Narayanan M Subramanian, Marietta, GA (US)

(73) Assignee: Invention Dynamics, LLC., Marietta, GA (US)

( * ) Notice: Subject to any disclaimer, the term of this patent is extended or adjusted under 35 U.S.C. 154(b) by 660 days.

(21) Appl. No.: 12/477,109

(22) Filed: Jun. 2, 2009

(65) Prior Publication Data

US 2009/0235473 A1  Sep. 24, 2009

Related U.S. Application Data

(63) Continuation of application No. 11/160,253, filed on Jun. 15, 2005, now abandoned.

(51) Int. Cl.
*B08B 9/38* (2006.01)

(52) U.S. Cl.
USPC .......................................................... 15/93.1

(58) Field of Classification Search .................... 15/93.1, 15/111, 236.01, 236.02, 401, 344, 4; 219/227, 219/228, 229, 230
See application file for complete search history.

(56) References Cited

U.S. PATENT DOCUMENTS 5,357,646 A * 10/1994 Kim ................................ 15/111

* cited by examiner

*Primary Examiner* — Robert Scruggs (57) ABSTRACT

A handheld modular mechanized windshield scraper with a rotating brush attachment to remove snow, and a rotating scraper blade attachment to scrape ice and frost from the windshield and window panes. The unit can have a built-in power source or can be connected directly to the power outlet of the automobile.

25 Claims, 10 Drawing Sheets

MODULAR PORTABLE FROST AND SNOW REMOVER

PRIORITY CLAIM

This application is a continuation in part of U.S. patent application entitled Powered mechanical apparatus for removing frost and snow from windshield and other viewing areas and having application Ser. No. 11/160,253, filed on Jun. 15, 2005, now abandoned the contents of which are incorporated herein by reference.

This application claims priority from U.S. provisional patent application entitled "Powered snow and frost remover," having application No. 61/058,246, filed on Jun. 3, 2008, the contents of which are incorporated herein by reference.

REFERENCE CITED

U.S. Pat. No. 3,935,425—David Weissberger
U.S. Pat. No. 4,930,176—Gideon Gelman
U.S. Pat. No. 5,357,646—David Kim
U.S. Pat. No. 5,973,294—Michael Schatt et al.
U.S. Pat. No. 6,969,828—William J. Deane III et al.

FIELD OF INVENTION

The present invention relates to handheld power operated mechanical devices for removing frost and snow from windshields and window panes of automobiles, trucks and other types of vehicles.

BACKGROUND OF INVENTION

The most common snow removal devices found in automobiles are simple hand-held devices having a scraper blade and/or brush on one or both ends of the handle. Generally, the hand-held devices tend to require a great deal of effort and are extremely slow in removing frost and snow, especially when the snow has hardened. To make it a little easier to remove frost and ice, heating devices generally comprising of an electrical coil, and battery to power the heater element, have been disclosed. The heating devices are of only slightly greater efficiency, since their power output is low and it takes a long time to melt the snow on the window pane or windshield. These have been disclosed in U.S. Pat. No. 5,973,294—"Heated windshield scraper device" awarded to Michael Schatt et al., U.S. Pat. No. 5,357,646—"Heated ice scraper" awarded to David Kim, U.S. Pat. No. 4,930,176—"Combination heated scraper and brush" awarded to Gideon Gelman and U.S. Pat. No. 6,969,828—"Ice scraper" awarded to William J. Deane III et al. Because the power output of the heater is limited while the heat required to melt snow on the windshield is large, the task of removing snow from a windshield is still likely to take a considerable amount of time.

To overcome the above limitations, David Weissberger obtained a patent with U.S. Pat. No. 3,935,425 for a "Mechanized electrically heated windshield cleaner". In this, the scraper head is moved back and forth in a straight line by a motor. At the same time, the tip of the scraper is heated using a heating element. Though this is a much better solution than the ones cited above, it also suffers from certain drawbacks. First, since it takes a relatively long time to melt snow, the heating element is ineffective. Second, since the scraper head does not have a guide, optimal scraping angle and pressure cannot be applied to the scraper head for it to do a good job. Third, since the scraper blade is not enclosed, it is not safe to work with an exposed blade. Fourth, the back and forth motion is not very efficient since the blade tip goes from zero velocity to a maximum velocity and back to zero velocity before changing its direction of movement. Fifth, to transfer a rotational motion of the motor to linear motion, a few linkages have to be used which increases the cost of manufacture. Sixth, since it has only one blade to scrape frost and snow off, it will be less efficient than a unit with multiple scraping blades.

SUMMARY OF INVENTION

The primary objective of the present invention is to come up with a powered mechanical scraper that overcomes the above mentioned deficiencies so as to minimize the driver's exposure to the elements and help the driver do a better job of cleaning the front and rear windshields and side window panes.

Another objective of the present invention is to make the manufacture of the improved mechanized scraper cost effective for the manufacturer to adopt it.

The foregoing objectives are attained by having a multi-blade circular scraper (so called because of the circular motion of the scraper blades) attached to a motorized reduction gear module. In this, the automobile driver can apply optimal pressure on the scraper blades. The multi-blade design hastens the process of frost and ice removal from the automotive windshield and window panes.

To aid in the fast removal of scraped snow from the work area, a fan is attached to the motor shaft. The air blown by the fan is directed at the work area and the scraped snow is blown away from the work area through vents in the circular housing.

The scraper drive module attachment can be removed from the motor to attach a brush module attachment so that accumulated snow can be brushed off before scraping frost from the windshield.

The scraper unit can be powered by rechargeable battery that can be charged using the car power outlet. Or it can be directly connected to the car power outlet using a long wire.

In the ensuing description, frost, ice and snow are used interchangeably.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The numbering is kept consistent across FIG. 1 through FIG. 17 for clarity. Hence like reference numerals designate like parts.

DETAILED DESCRIPTION OF THE INVENTION

Figure 1:
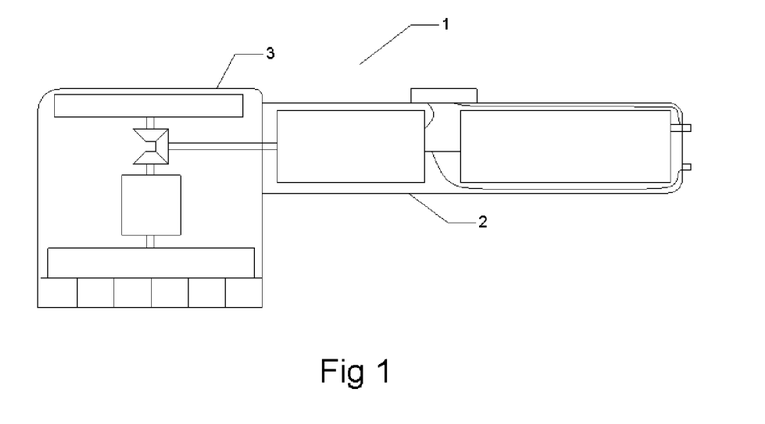
FIG. 1 is a block diagram of a preferred embodiment of the modular portable mechanized handheld scraper of the present invention.

FIG. 1 refers to a preferred embodiment of the present invention of a modular, portable mechanized handheld scraper unit with its major internal parts exposed. The whole unit is generally referred to as 1. Unit 1 has a power drive module 2 and a scraper drive module attachment, 3. Power drive module 2 can also be used with a brush module attachment, 4, shown in FIG. 17. Thus scraper drive module attachment, 3 and brush module attachment, 4 are attachments to power drive module, 2.

Figure 2:
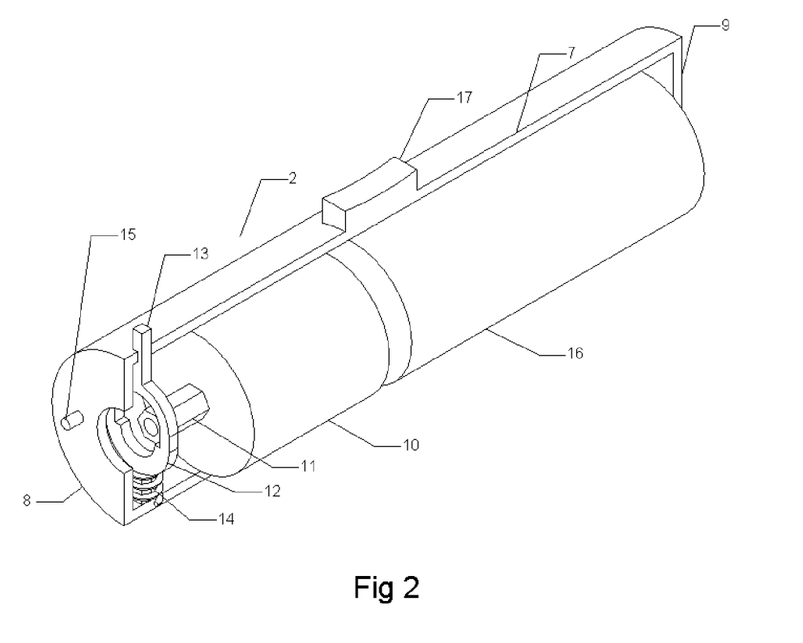
FIG. 2 is a perspective view of the power drive module of the present invention with the inside components visible.
Figure 3:
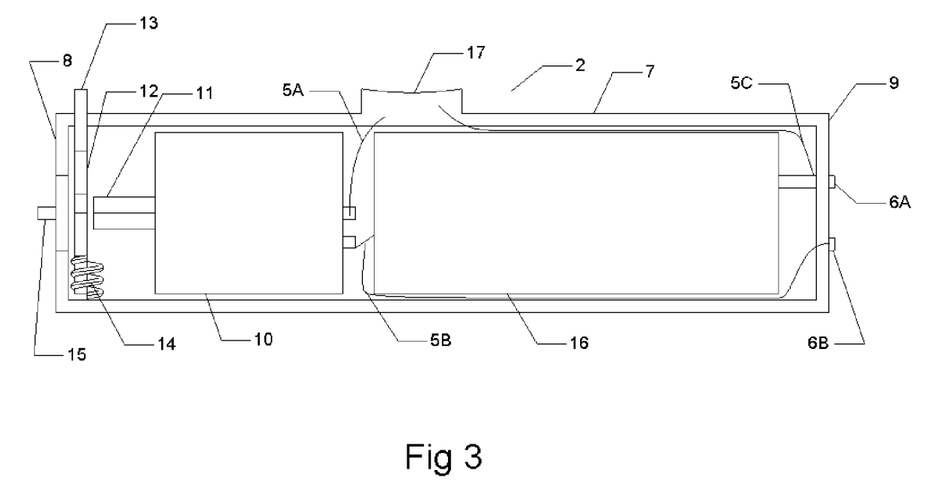
FIG. 3 is a side view of the power drive module of FIG. 2.
Figure 4:
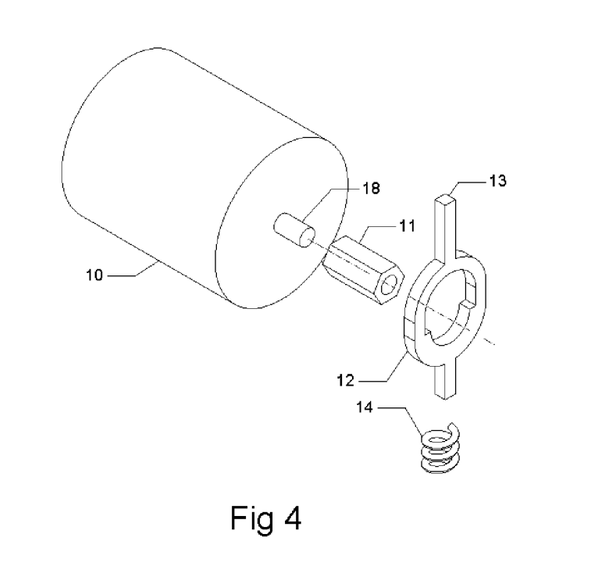
FIG. 4 is a perspective view of the lock pin means, spring, drive shaft and electric motor arrangement of the present invention.

FIG. 2 and FIG. 3 are different views of the power drive module. FIG. 4 shows the lock pin means arrangement inside power drive module 2. Referring to FIG. 2 through FIG. 4, power drive module 2 comprises of a hollow handle, 7, with a first end 8 and a second end 9. Inside the hollow handle are contained an electric motor, 10, a drive shaft, 11, lock pin means 12, spring 14, rechargeable battery, 16 and switch, 17. Drive shaft 11 is rigidly attached to shaft 18 of electric motor, 10. The terminals of rechargeable battery, 16 are connected to terminals of electric motor 10 via switch 17, using wires 5A, 5B and 5C. Rechargeable battery terminals are also connected to two electrical contact pins, numbered 6A and 6B located on the second end of the hollow handle. In this arrangement, when the switch is turned on, electric power is applied to electric motor 10 and drive shaft 11 rotates. Electrical contact pins 6A and 6B mate with an external charging unit to recharge the battery. Locator pin 15 on first end 8 is used to align the power drive module with any of the said attachments. Lock pin means 12 is normally pushed up by spring 14. The end of lock pin means that is away from the spring protrudes out through a hole in hollow handle 7 and is numbered 13. Henceforth, this protruding part, 13, of the lock pin means will be referred to as lock pin release means. When the scraper drive module attachment or the brush module attachment is to be attached to the power drive module or detached from the power drive module, lock pin means 12 is disengaged by pushing down the lock pin release means, 13. When the operator releases the finger from the lock pin release means, if locator pin 15 is aligned properly with the locator hole in attachments, which is described below, the spring will bush the lock pin means back to its original state, locking the brush module attachment or scraper drive module attachment securely with the power drive module at the groove on the attachments for a proper assembled relationship. The cross section of drive shaft 11 should be such that positive drive without slippage can be imparted to said attachments by the power drive module. Hence it is preferable to have a non-circular cross section for drive shaft 11. In FIG. 2 through FIG. 4, the cross section of drive shaft 11 is hexagonal.

Figure 5:
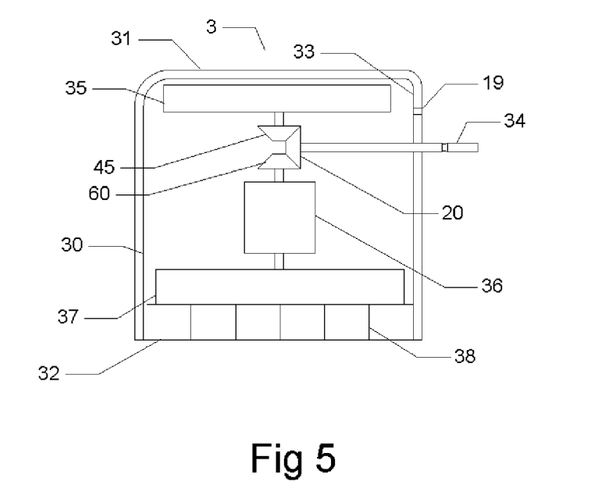
FIG. 5 is a block diagram of the scraper drive module attachment of the present invention.
Figure 6:
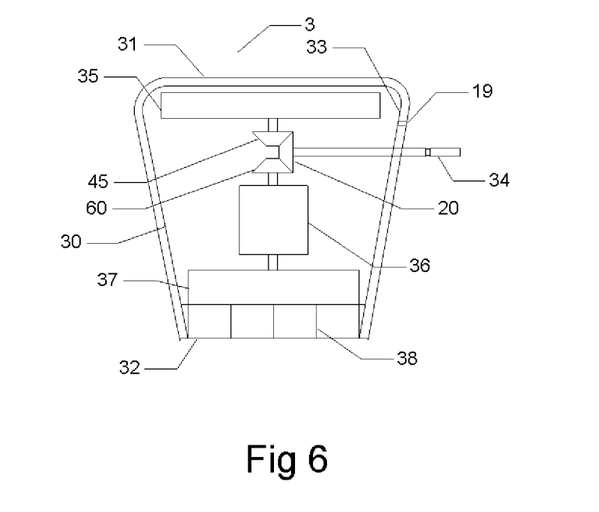
FIG. 6 is a block diagram of the scraper drive module attachment of another preferred embodiment of the present invention.
Figure 7:
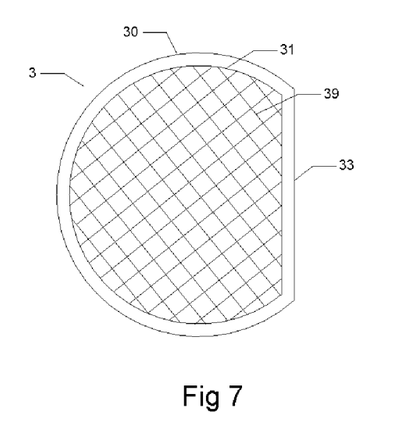
FIG. 7 is a view of the permeable membrane attached to the scraper drive module attachment of the present invention.

FIG. 5 shows scraper drive module attachment, 3. It comprises of a uniform cylindrical hollow body, 30, inside which are contained a fan module, 35, a first reduction gear module, 36, a scraper blade module, 37, and a connector module, 34. The cylindrical hollow body has a first end, marked 31, and a second end marked 32. A permeable membrane, 39, covers the opening at first end, 31, of the cylindrical hollow body as shown in FIG. 7. Close to second end, 32, and all around the circumference of the cylindrical hollow body, 30, are a number of vents, marked 38. When the fan module, 35, is operated, air is sucked in through permeable membrane, 39, and ejected through vents, 38. Near first end 31, a section of the circumference of cylindrical hollow body, 30, where the scraper drive module attachment is mated with the power drive module is marked 33. In section 33, there is a complimentarily configured locator hole, 19, which will removeably engage with locator pin 15 of the power drive module when the power drive module and the scraper drive module attachment are in proper assembled relationship. FIG. 6 is similar to FIG. 5 except that the cylindrical hollow body, 30, is tapered from first end, 31, to second end, 32. Because of the taper, air velocity is increased as the air reaches the work surface where the scraper blade module, 37, is acting to remove frost and snow.

Figure 8:
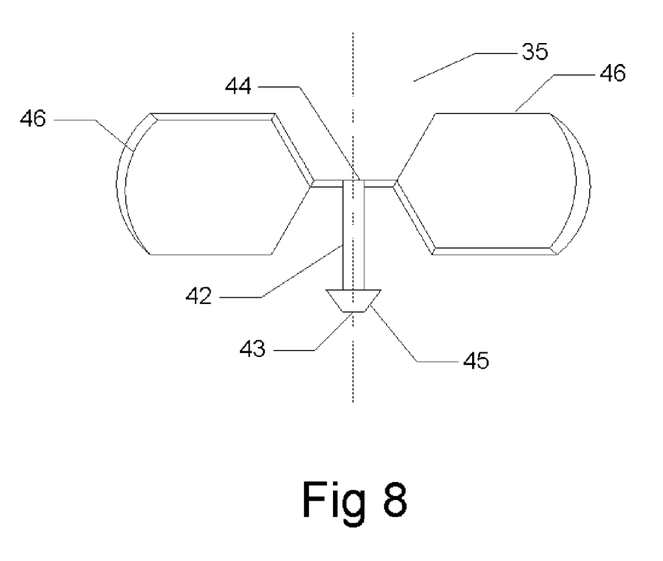
FIG. 8 is a block diagram of the fan module of the present invention.

FIG. 8 shows the fan module, 35, which consists of a shaft, 42, with a first end, 43, and a second end, 44. A miter gear, 45 is rigidly attached to first end, 43 of the fan module. Two or more fan blades, 46 are attached to the circumference of shaft 42 at second end, 44. Miter gear, 45, is coupled rotatetably to miter gear in said connector module. So, when the miter gear in the connector module is rotated, miter gear, 45, and fan blades, 46, rotate.

Figure 9:
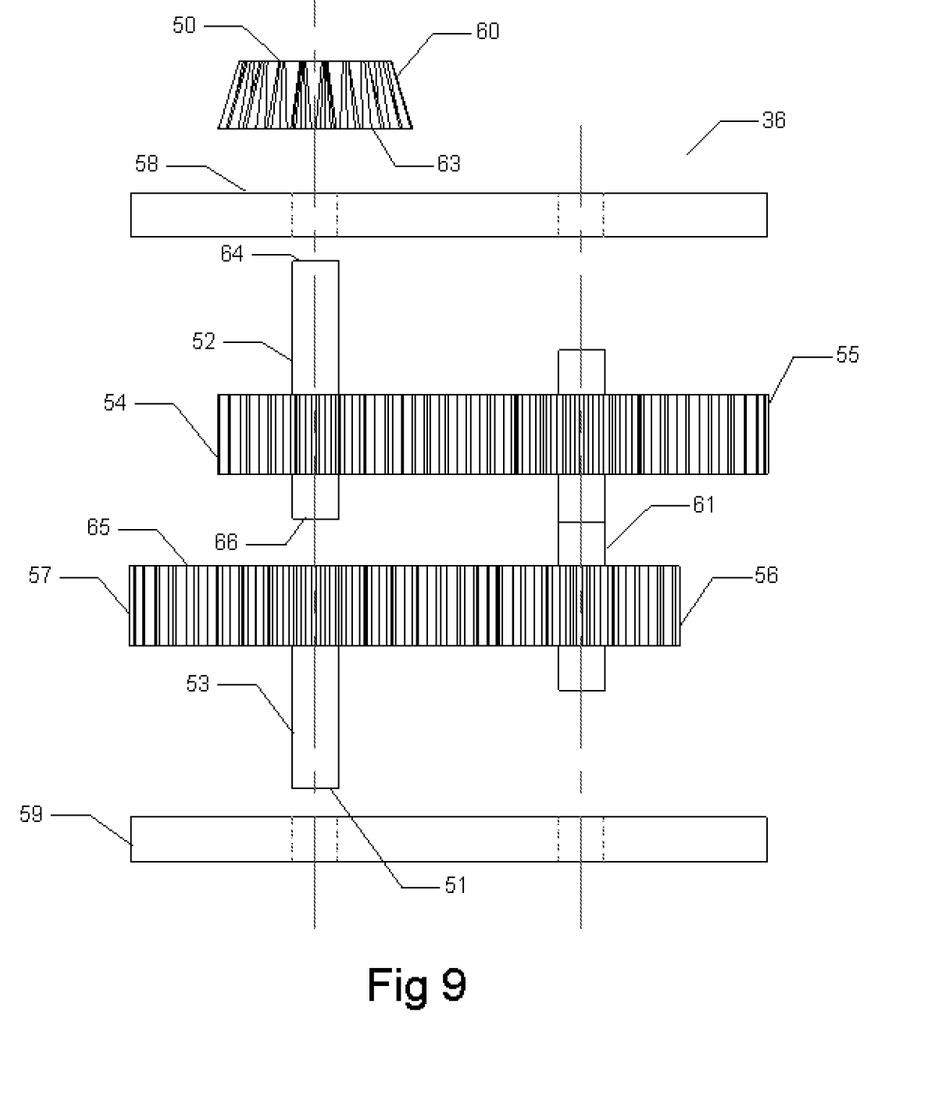
FIG. 9 is the side view of the first reduction gear module of the present invention.
Figure 10:
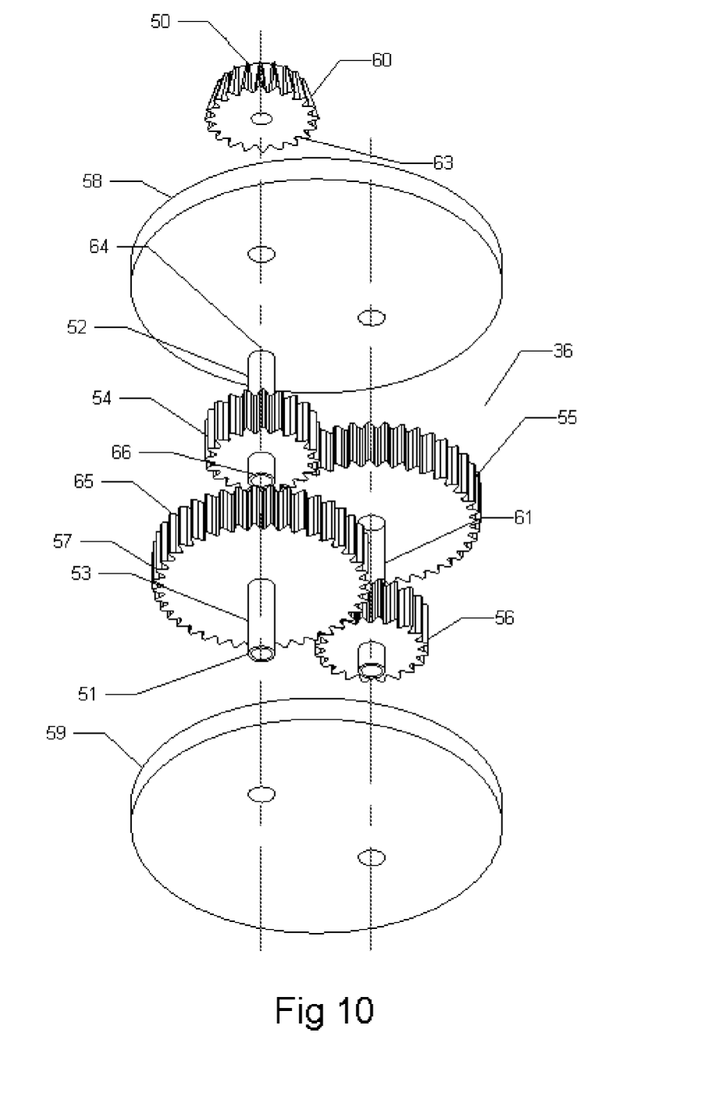
FIG. 10 is a perspective view of the first reduction gear module of the present invention.
Figure 12:
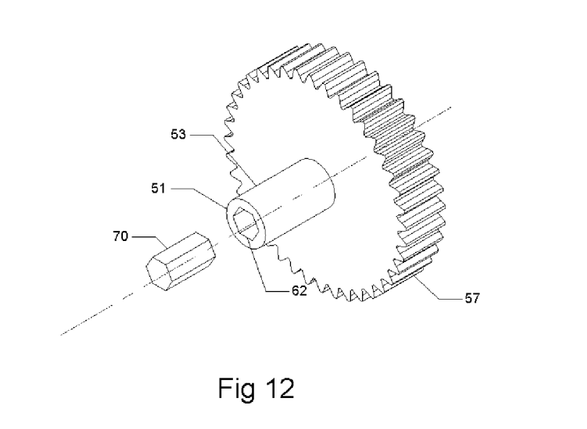
FIG. 12 is a perspective view of the scraper shaft mating with the output shaft at the second end of the first reduction gear module of the present invention.

FIG. 9 and FIG. 10 show the different views of first reduction gear module, 36. The first reduction gear module consists of two plates, numbered 58 and 59 between which are rotatetably mounted a combination of gears numbered 54,

55,56 and 57. These gears driveably engage with each other as shown in the figure to reduce input rotational speed or angular velocity to the desired output rotational speed or angular velocity. A shaft, 52, having a first end 64 and a second end 66 is rigidly attached to gear 54. Second end 66 of shaft 52 loosely passes through the center of gear 57 such that gear 57 can rotate independently of shaft 52. First end 64 of shaft 52 rotatetably passes through plate 58. Miter gear 60 is rigidly attached to shaft 52 at said first end 64. Gear 57 is rigidly connected to a hollow output shaft 53. Gear 57 and hollow shaft 53 together have a first end, 65 and a second end, 51. Shaft 53 passes rotatetably through plate 59 and provides the first reduction gear module output at the second end, 51, which is also the second end of the first reduction gear module. Miter gear 60 is the first end of first reduction gear module 36. Miter gear 60 is coupled rotatetably to miter gear in said connector module. The first reduction gear module receives rotational input through miter gear 60. Shaft 61 is rigidly attached to gears 55 and 56 as shown in the figure. Though four spur gears are shown in the module, there can be any number of gears in the reduction gear module to accomplish the desired speed reduction. Also, the gears could be of other types such as planetary gears, combination of planetary and spur gears etc. The inside surface, 62, of output shaft 53 is complimentarily configured to scraper shaft 70 of said scraper blade module such that scraper shaft 70 is rigidly fixed to output shaft 53. The cross-section of shaft 53 of the first reduction gear module and scraper shaft 70 on said scraper blade module is shown in FIG. 12.

Figure 11:
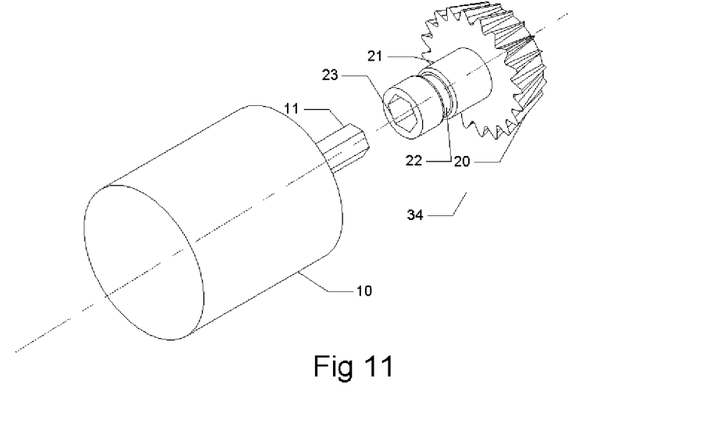
FIG. 11 is a perspective view of the electric motor with drive shaft mating with the connector module of the present invention.

FIG. 11 shows the connector module, 34, removeably and driveably mating with drive shaft, 11. The connector module consists of a miter gear 20 with a hollow input shaft 21 as shown in FIG. 11. The inside surface, 23, of input shaft 21 is complimentarily configured to drive shaft 11 on said electric motor such that input shaft 21 can removeably and driveably connect to drive shaft 11 and receive rotational input from drive shaft 11. Input shaft 21 has a groove 22 on its surface such that when the power drive module and the scraper drive module attachment are in proper assembled relationship, lock pin means 12 will engage in groove 22, thus preventing the power drive module from separating from the scraper drive module attachment. Miter gear 20 engages rotatetably with miter gear 45 of the fan module and miter gear 60 of the first reduction gear module as shown in FIG. 5 and FIG. 6 to transmit its rotational output to the rotational input, 45, of fan module and the rotational input, 60, of first reduction gear module.

Figure 13:
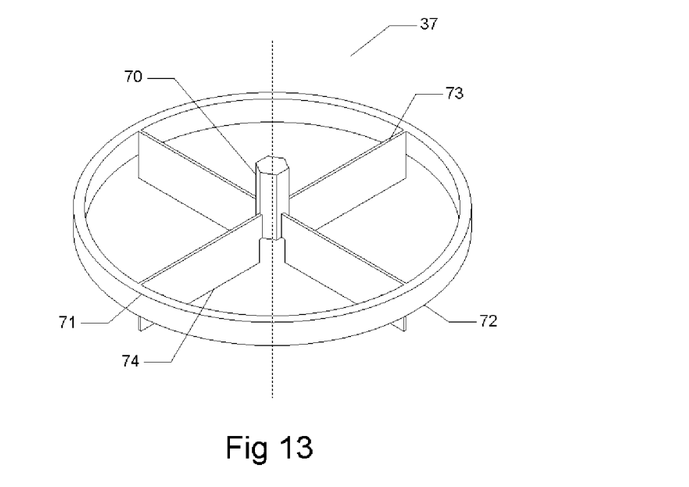
FIG. 13 is a perspective view of a preferred embodiment of the present invention for the scraper blade module where the blades are straight and where the blades do not meet at the center.

FIG. 13 is a perspective view of the preferred embodiment of scraper blade module 37. Scraper blade module, 37 has a scraper shaft 70, to the circumference of which a scraper blade assembly, consisting of a plurality of straight scraper blades, 73, are attached radially. The angular distance between any two consecutive scraper blades is substantially the same. All the scraper blades are substantially the same linear length and their lengths are such that the bottom edge of the scraper blade module can fit inside the cylindrical hollow body, 30, at the second end. The scraping edges, 74, of these plurality of scraper blades are substantially on the same plane which coincides with the plane of the second end of the cylindrical hollow body, 30. To increase the rigidity of these scraper blades, the radial ends of this plurality of scraper blades that are removed farther away from scraper shaft 70, are attached to the inner circumference of a ring 71. The bottom end of the scraper shaft does not extend to the scraping edges 74 of the scraper blades. Hence, when the scraper blades scrape snow, the scraper shaft does not touch the glass. Bottom edge, 72, of ring 71 does not extend to the scraping edges 74 of the scraper blades so that scraped snow and frost can escape through the gap between edge 72 and the surface being scraped. In this embodiment, the scraper blades do not meet at the center. Scraper shaft 70 is rigidly connected to output shaft 53 of the first reduction gear module such that the output at the second end 51 of said first reduction gear module is transmitted to the scraper blade module.

Figure 14:
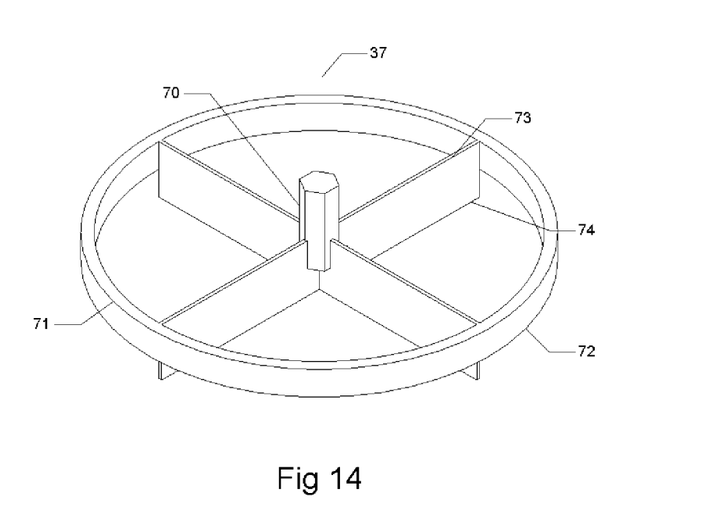
FIG. 14 is a perspective view of another preferred embodiment of the present invention for the scraper blade module where the blades are straight and where the blades meet at the center.

FIG. 14 is a perspective view of a second preferred embodiment of the scraper blade module 37. It is the same as FIG. 13 except that the scraper blades meet at the center.

Figure 15:
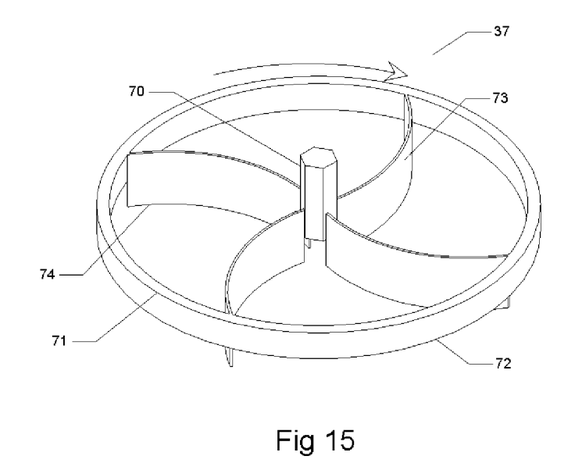
FIG. 15 is a perspective view of another preferred embodiment of the present invention for the scraper blade module where the blades are curved and where the blades do not meet at the center.

FIG. 15 is a perspective view of a third preferred embodiment of the scraper blade module 37. It is similar to FIG. 13 except that all the scraper blades are curved substantially in the same direction by the same angle. Since the scraper blades are curved, it requires less power than the straight scraper blades to scrape snow. In this embodiment, the scraper blades do not meet at the center. The arrow shows the direction of rotation of the scraper blades.

Figure 16:
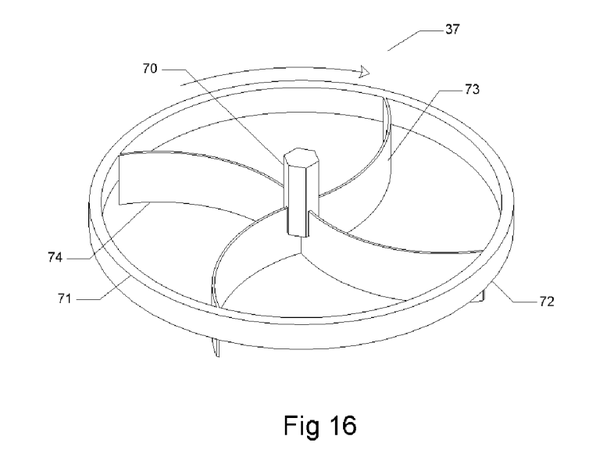
FIG. 16 is a perspective view of another preferred embodiment of the present invention for the scraper blade module where the blades are curved and where the blades meet at the center.

FIG. 16 is a perspective view of a fourth preferred embodiment of the scraper blade module 37. It is the same as FIG. 15 except that the scraper blades meet at the center.

Figure 17:
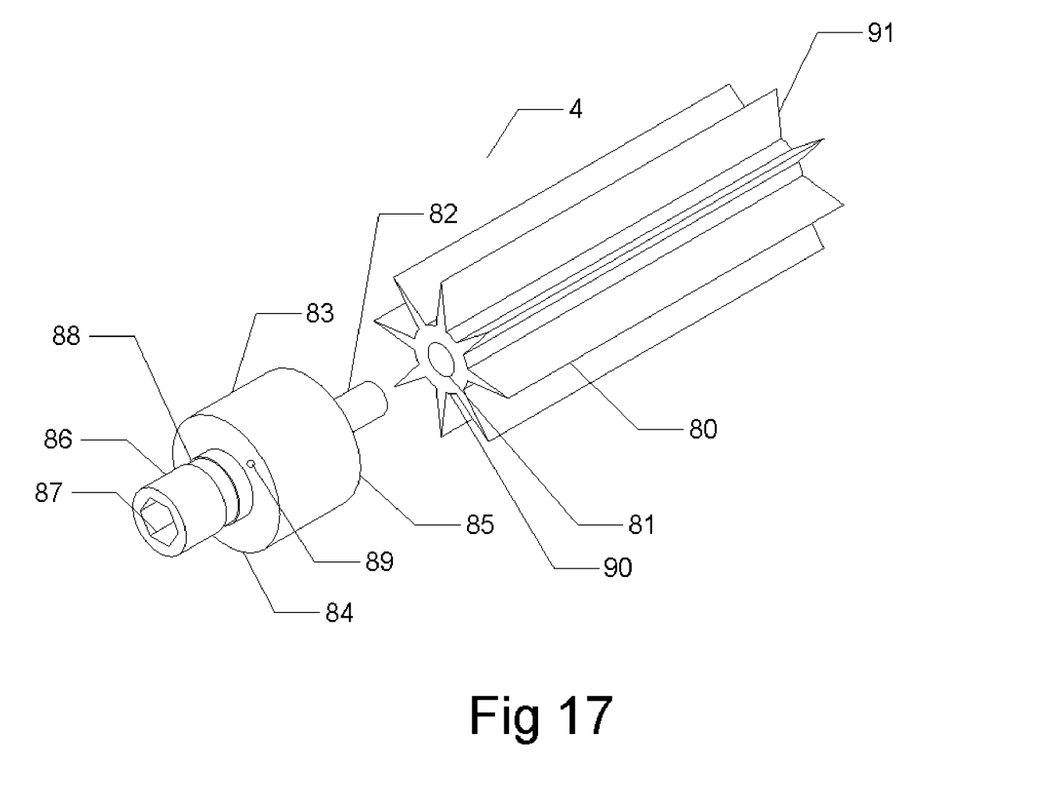
FIG. 17 is a perspective view of the brush module attachment of the present invention.

FIG. 17 is a perspective view of brush module attachment, 4. It consists of a cylindrical shaft, 80, and a second reduction gear module, 83. The cylindrical shaft has a first end, 90 and a second end, 91. Its circumference is covered with a plurality of bristles. First end, 90, has a hole at the center to accept output shaft 82 of said second reduction gear module, 83. Second reduction gear module 83 has a first end, 84 and a second end, 85. A hollow input shaft, 86, extends from first end, 84 and said output shaft, 82 extends from second end, 85. The diameter of output shaft 82 is such that output shaft 82 is rigidly connected to cylindrical shaft 80 via hole 81. The inside surface, 87, of input shaft 86 is complimentarily configured to drive shaft 11 such that input shaft 86 can removeably and rotatetably engage and disengage with drive shaft 11. The output rotational motion or angular velocity of the second reduction gear module is less than the input rotational motion or angular velocity of the second reduction gear module. Input shaft 86 has a groove, 88, such that when the power drive module and the brush module attachment are in proper assembled relationship, lock pin means 12 will engage in groove 88, thus preventing the power drive module from separating from the brush module attachment. First end 84 of the second reduction gear module has a complimentarily configured locator hole, 89, with which locator pin 15 of the power drive module will removeably engage when the power drive module and the brush module attachment are in proper assembled relationship. Inside the second reduction gear module, 83, is gear arrangement similar to that found in the first reduction gear module. Since the rotational speed of the brush can be more than the rotational speed of the scraper blade module, the gear ratio of the first reduction gear module, 36, is higher than the gear ratio of the second reduction gear module, 83.

When the user wants to clear the windshield of snow and frost, he presses down the lock pin release means on the power drive module and attaches the brush module attachment to the power drive module, making sure that the locator hole 89 is aligned with the locator pin 15. When the user releases the finger from the lock pin release means, lock pin means, 12 is pushed up by spring 14 and lock pin means engages in groove 88. Then he turns on switch 17 to power the electric motor. The electric motor turns the second reduction gear module which in turn, turns the plurality of bristles on the brush module attachment. The user moves the rotating brush over the accumulated snow and clears it from the windshield. Then he powers off the motor, presses the lock pin release means and releases the brush module attachment. While holding down the lock pin release means, he attaches the scraper drive module attachment, making sure that the locator pin 15 is aligned with locator hole 19. When the finger is released from the lock pin release means, if the scraper drive module attachment is properly attached to the power drive module, lock pin means 12 will engage in groove 22 of the connector module and lock pin release means, 13 will project out. The user then turns on power to the electric motor. This turns the connector module which in turn, turns the fan module as well as the first reduction gear module. The scraper blade module, which is rigidly connected to the output of the first reduction gear module, rotates to remove frost from the windshield. The user holds the modular portable mechanized handheld scraper in such a way that the scraper blades touch the frost and scrape it. The fan blades draw air through the permeable membrane and blow it on the scraped frost. The scraped frost is blown out through vents, 38, on the cylindrical hollow body. Once all the glass surfaces such as the front and rear windshield and window panes have been cleared of frost, the user can power off the unit and replace it in the car power outlet to recharge the unit for future use.

What is claimed is:

1. A modular portable mechanized handheld scraper comprising:
   a) a power drive module comprising of a hollow handle with a first end and a second end; said first end having a locator pin; said hollow handle enclosing a lock pin means, a lock pin release means, rechargeable battery, electrical contact pins in electrical communication with said rechargeable battery, switch means, an electric motor means electrically connected to said rechargeable battery through said switch means and a drive shaft means rigidly connected to shaft of said electric motor means;
   b) a scraper drive module attachment, removeably attached to said drive shaft means of said power drive module; said scraper drive module attachment comprising of a cylindrical hollow body with an open first end and an open second end; said first end of said cylindrical hollow body covered by a permeable membrane; said cylindrical hollow body enclosing a fan module, a first reduction gear module, a scraper blade module and a connector module; said connector module comprising of a hollow input shaft with a first end and a second end; said first end of said hollow input shaft located outside said cylindrical hollow body; said first end of said hollow input shaft rotatetably and removeably coupled to said drive shaft means of said power drive module; said hollow input shaft having a groove near said first end; said second end of said hollow input shaft located inside said cylindrical hollow body; said hollow input shaft having a miter gear at said second end; said fan module comprising of a first end with a miter gear rotatetably coupled to said miter gear of said connector module, and a second end having a plurality of fan blades; said first reduction gear module having a first end and a second end; said first reduction gear module having a miter gear at said first end coupled rotatetably to said miter gear of said connector module; said scraper blade module having a scraper shaft and a scraper blade assembly; said scraper shaft rigidly connecting said second end of said first reduction gear module with said scraper blade assembly; and
   c) a brush module attachment removeably attached to said drive shaft means of said power drive module, comprising of a second reduction gear module and a cylindrical body; said second reduction gear module having a first end with a locator hole and a second end; a hollow input shaft with a groove extending from said first end of said second reduction gear module; an output shaft extending from said second end of said second reduction gear module; said cylindrical body having a first end and a second end; said first end of said cylindrical body rigidly attached to said output shaft of said second reduction gear module; said input shaft of said second reduction gear module removeably attached to said drive shaft means of said power drive module.

2. A modular portable mechanized handheld scraper of claim 1, wherein said lock pin means engages in said groove of said brush module attachment to securely retain said power drive module and said brush module attachment in proper assembled relationship once said power drive module and said brush module attachment have been brought together in proper assembled relationship.

3. A modular portable mechanized handheld scraper of claim 1, wherein said lock pin release means disengages said lock pin means from said groove of said brush module attachment to release said power drive module from said brush module attachment.

4. A modular portable mechanized handheld scraper of claim 1, wherein said lock pin means engages in said groove of said scraper drive module attachment to securely retain said power drive module and said scraper drive module attachment in proper assembled relationship once said power drive module and said scraper drive module attachment have been brought together in proper assembled relationship.

5. A modular portable mechanized handheld scraper of claim 1, wherein said lock pin release means disengages said lock pin means from said groove of said scraper drive module attachment to release said power drive module from said scraper drive module attachment.

6. A modular portable mechanized handheld scraper of claim 1, wherein said cylindrical body of said brush module attachment has a plurality of bristles emanating radially therefrom.

7. A modular portable mechanized handheld scraper of claim 1, wherein said input shaft of said second reduction gear module is complimentarily configured to said drive shaft of said power drive module to rotatetably and removeably engage said brush module attachment with said power drive module.

8. A modular portable mechanized handheld scraper of claim 1, wherein the angular velocity of said input shaft of said second reduction gear module is greater than the angular velocity of said output shaft of said second reduction gear module.

9. A modular portable mechanized handheld scraper of claim 1, wherein said locator hole on said first end of said second reduction gear module removeably engages with said locator pin of said power drive module when said power drive module and said brush module attachment are in proper assembled relationship.

10. A modular portable mechanized handheld scraper of claim 1, wherein said cylindrical hollow body of said scraper drive module attachment has a locator hole on the circumference near said first end; said locator hole removeably engages with said locator pin of said power drive module when said power drive module and said scraper drive module attachment are in proper assembled relationship.

11. A modular portable mechanized handheld scraper of claim 1, wherein said cylindrical hollow body of said scraper drive module attachment has a plurality of vents on its circumference close to said second end.

12. A modular portable mechanized handheld scraper of claim 11, wherein said cylindrical hollow body of said scraper drive module attachment is uniform in diameter.

13. A modular portable mechanized handheld scraper of claim 11, wherein said cylindrical hollow body of said scraper drive module attachment is tapered from said first end to said second end.

14. A modular portable mechanized handheld scraper of claim 1, wherein said fan module is configured to draw air into said cylindrical hollow body of said scraper drive module attachment through said permeable membrane and blow air out through said plurality of vents in said cylindrical hollow body of said scraper drive module attachment.

15. A modular portable mechanized handheld scraper of claim 1, wherein the angular velocity at said first end of said first reduction gear module is greater than the angular velocity at said second end of said first reduction gear module.

16. A modular portable mechanized handheld scraper of claim 1, wherein said scraper blade assembly has a plurality of scraper blades connected radially to said scraper shaft; said scraper blades having substantially the same angular distance between consecutive blades; said scraper blades having substantially the same linear length; said scraper blade assembly radial length less than inside radius of said second end of said cylindrical hollow body of said scraper drive module attachment.

17. A modular portable mechanized handheld scraper of claim 16, wherein said scraper blades have scraping edges on substantially the same plane; said plane of said scraping edges being substantially the same as the plane of said second end of said cylindrical hollow body of said scraper drive module attachment.

18. A modular portable mechanized handheld scraper of claim 17, wherein radial ends of said scraper blades are connected to a ring; bottom plane of said ring being above said plane of said cylindrical hollow body.

19. A modular portable mechanized handheld scraper of claim 18, wherein said scraper blades are straight with respect to radial lines.

20. A modular portable mechanized handheld scraper of claim 18, wherein said scraper blades are curved with respect to radial lines.

21. A modular portable mechanized handheld scraper of claim 20, wherein said scraper blades are curved substantially in the same direction.

22. A modular portable mechanized handheld scraper of claim 21, wherein said scraper blades have substantially the same angle of curvature.

23. A modular portable mechanized handheld scraper of claim 1, wherein said hollow input shaft of said connector module is complimentarily configured to said drive shaft of said power drive module to rotatetably and removeably engage said scraper drive module attachment with said power drive module.

24. A modular portable mechanized handheld scraper of claim 1, wherein cross section of said drive shaft means of said power drive module is non-circular.

25. A modular portable mechanized handheld scraper of claim 1, wherein said electrical contact pins are configured to electrically communicate with an external charging unit to recharge said rechargeable battery.

* * * * *